United States Patent [19]

Howard et al.

[11] Patent Number: 4,470,945
[45] Date of Patent: Sep. 11, 1984

[54] METHOD AND APPARATUS FOR APPLYING AN ELECTRON BEAM DRILLING BACKER TO A METAL SHEET

[75] Inventors: Curtiss G. Howard, Manchester, Conn.; Lester W. Jordan, Cranston, R.I.; Chester E. Yaworsky, Glastonbury; Frank L. Zampino, Enfield, both of Conn.

[73] Assignee: United Technologies Corporation, Hartford, Conn.

[21] Appl. No.: 361,664

[22] Filed: Mar. 25, 1982

[51] Int. Cl.³ .............................................. B29D 9/04
[52] U.S. Cl. ................................. 264/511; 29/421 R; 29/424; 264/259; 425/111; 425/218; 425/458
[58] Field of Search .................. 425/87, 111, 117, 218, 425/458; 264/510, 511, 259; 156/245, 246, 187, 257; 219/121 EH; 29/421 R, 424

[56] References Cited

U.S. PATENT DOCUMENTS

| | | | |
|---|---|---|---|
| 1,132,264 | 3/1915 | Hellyar et al. | 425/218 |
| 2,702,769 | 2/1955 | Alderfer | 264/259 |
| 3,159,696 | 12/1964 | Hodgson, Jr. | 264/216 |
| 3,183,136 | 5/1965 | Purdy | 156/257 |
| 3,397,102 | 8/1968 | Schraub | 156/257 |
| 3,472,715 | 10/1969 | Weinbrenner et al. | 156/245 |
| 3,520,747 | 7/1970 | McGaughey | 156/187 |
| 3,562,383 | 2/1971 | Ayres | 264/322 |
| 3,668,028 | 6/1972 | Short | 264/154 |
| 3,728,777 | 4/1973 | Crowe | 264/511 |
| 3,814,781 | 6/1974 | Oka et al. | 264/338 |
| 3,875,280 | 4/1975 | Story | 264/510 |
| 4,239,954 | 12/1980 | Howard et al. | 219/121 EH |
| 4,337,220 | 6/1982 | Arimatser | 156/187 |

FOREIGN PATENT DOCUMENTS 54-3700  2/1979  Japan ................................ 156/187

Primary Examiner—James B. Lowe
Attorney, Agent, or Firm—C. G. Nessler

[57] ABSTRACT

Disclosed is a method and fixture for applying a thin layer of polymer material to a piece of wavy sheet metal. The sheet is drawn to the smooth surface of a fixture using a vacuum, and polymer is flowed across the surface using a curved leveling board, which produces a generally uniform thickness molding. The edges of the backer are molded with a bevel edge by shaped side rails, to provide a relief around the edge of the layer. Thus a raised up portion usually occurring at the edge rail location will not interfere with the precise spacing which the layer is intended to produce between the sheet and cylindrical workpiece holder.

2 Claims, 9 Drawing Figures

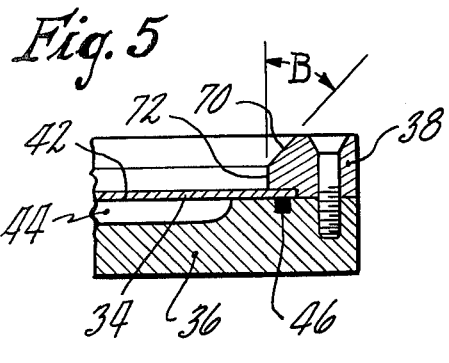
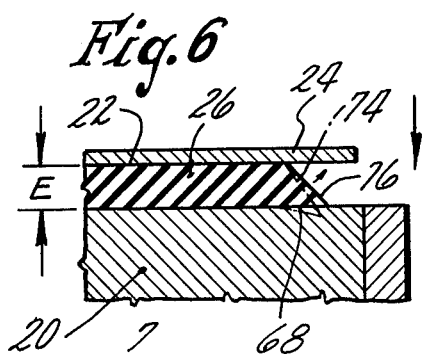
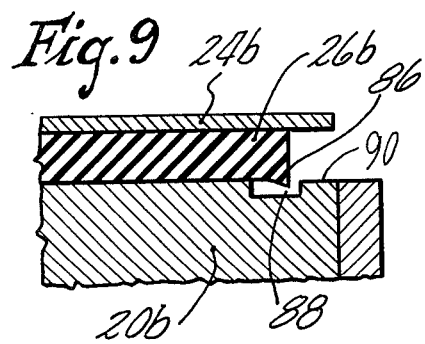
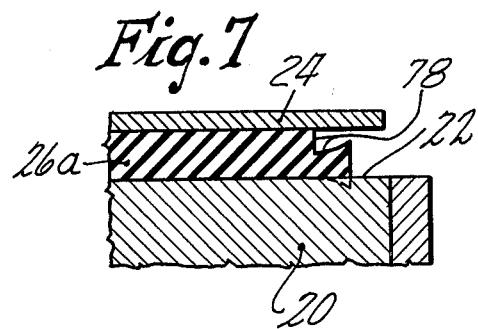
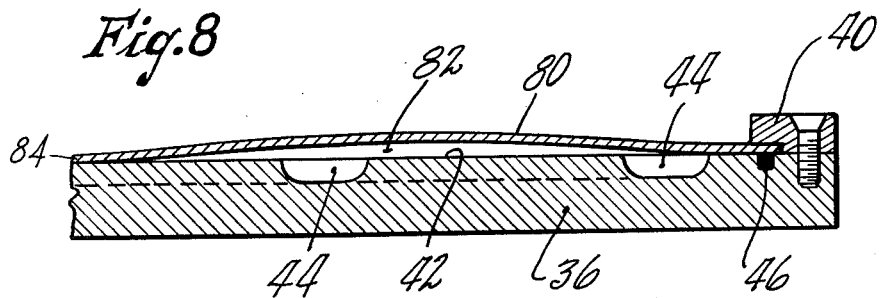

METHOD AND APPARATUS FOR APPLYING A POLYMER LAYER TO A METAL SHEET

TECHNICAL FIELD

The present invention relates to a method and apparatus for applying polymeric material to a workpiece.

BACKGROUND

In many technical endeavors it is necessary to provide a relatively thin uniform layer of polymeric material on a surface of a metal sheet. For instance, such a requirement arises in energy beam hole drilling of sheet metal, such as in the use of an electron beam or a laser beam. Under such circumstances the layer of polymeric material is called a backer and it is necessary that the material be provided in a uniform layer thickness and in intimate contact with the exit side of the workpiece in which a hole is being drilled. During drilling the workpiece is mounted on a holder and the backer is clamped therebetween. Backers are described in U.S. Patent No. 4,239,954 of Howard et al, having inventors and assignee in common herewith.

Common titanium and iron base alloy sheets will normally be quite uniform in thickness. However, they also will regularly have a certain amount of characteristic waviness. That is, the sheet will not lie in a flat plane and if the backer is a separately extruded layer of material the waviness of the sheet metal will cause a lack of intimacy in contact between the backer and the sheet metal when they are mounted on a drilling holder work surface. The result is that the backer does not fulfill its function adequately.

If the backer is instead applied directly to the surface of the sheet metal, prior to the sheet metal being mounted on the drilling workpiece holder, problems are also found in achieving the desired end result. While the desired intimacy between the workpiece and backer is easily achievable, flowing an "even" layer on a wavy workpiece will do nothing to correct the waviness. Waviness in the workpiece surface present to the energy beam will vary the focal point and cause deviant holes. In addition, for most polymeric substances, difficulties are found in getting a uniform layer, even on a perfectly flat workpiece. These difficulties arise due to the flow and curing characteristics of rubbers and waxes commonly used in backers.

DISCLOSURE OF INVENTION

An object of the invention is to provide a method of applying a backer to sheet metal in a uniform fashion. A further object is to compensate for irregularities, such as waviness, in the sheet metal, and in the flow and cure properties of polymeric backers so that a sheet laid against a smooth workpiece holder is precisely placed for electron beam drilling.

According to the invention a sheet metal workpiece is placed on the smooth surface of a fixture, and is drawn tightly to the surface, as by a vacuum created in narrow channels within the surface. Flowable backer material is leveled, with the smooth surface as a reference, and caused to solidify. There is a tendency for some backer materials, such as RTV rubber, to solidify with less than average thickness near the center of the sheet. For such materials a leveling board is adapted to slide across the fixture, parallel to the surface. The board has a concave edge, to increase the amount of material left in the center of the sheet, compared to that which a straight-edge board provides. Thus, when the backer solidifies, it will be found to have a uniform thickness.

A vacuum is preferred for drawing the sheet against the flat fixture surface, although other means of creating uniform force may be used. With a vacuum, the surface of the fixture is provided with recessed seals, such as o-rings. If the sheet is wavy, then the sheet is positioned on the fixture so that the wavy portion is positively raised from the fixture surface. Applying the backer to the side resulting from this practice causes the sheet to better conform to the workpiece holder surface when the subsequent drilling operation is conducted.

Preferably, rails circumscribe the fixture and help clamp the sheet metal against the peripheral seal. After a vacuum is applied to the channels and the sheet metal is drawn flat against the surface of the fixture, liquid polymer is flowed into the cavity above the sheet between the rails, and allowed to cure. When a curved leveling board is used the backer will be found to have a generally uniform thickness after the sheet is released from the fixture. However, with certain backers there is a capillary attraction at the rails, and a meniscus forms there, making the backer locally thicker. This will interfere with the accuracy of sheet position during drilling. To overcome this effect, a relief is provided around the periphery of the backer. That is, the backer is undercut at the edge where it is raised up. Preferably the rails are beveled outwardly, and this provides a suitable undercut when the backer is molded in the fixture. Thus, when a sheet with backer is clamped on the workpiece holder prior to drilling, the raised up portion of the captured backer will be easily compressed and the sheet will be evenly positioned according to the average thickness of the backer. Stated in the general mode, we provide relief between the electron beam workpiece holder and the sheet, around the periphery of the backer, either by molding the relief in the backer or providing it in the workpiece holder. The invention readily provides precision backers; for example a RTV silicone rubber backer of about 2.54 mm thick made in accord with the invention will space a workpiece uniformly from a holder, within about ±0.1 mm accuracy or better.

The foregoing and other objects, features and advantages of the present invention will become more apparent from the following description of preferred embodiments and accompanying drawings.

BRIEF DESCRIPTION OF DRAWINGS

FIG. 5 shows in detail an embodiment of the beveled side rails.

FIG. 6 is a detail view of the backer, as it is captured between the workpiece holder and workpiece shown in FIG. 1, and illustrates the advantage of the beveled edge.

FIG. 7 is similar to FIG. 6 and illustrates another embodiment of the relief on the backer edge.

FIG. 8 is a sectional view, similar to FIGS. 3–4, showing how a sheet metal is positioned in the fixture, with respect to the sheet metal waviness.

FIG. 9 is a sectional view, similar to FIGS. 5–7, and shows another embodiment of the invention wherein the workpiece holder has a relief around its circumference to accomodate a backer made in a fixture with a square edged rail.

BEST MODE FOR CARRYING OUT THE INVENTION

The invention is described in the context of a silicone rubber backer applied to a titanium sheet metal panel, where the sheet metal panel is to be electron beam drilled by wrapping it around the periphery of a drum shaped workpiece holder. However, the invention will be found useful for other workpiece and workpiece holder configurations. It also will be suited for uses other than electron beam drilling, wherever thin polymeric layers must be applied uniformly to sheets which are not flat. The invention may be used for applying various composition backers, including those described in Howard et al. U.S. Pat. No. 4,239,954, the disclosure of which is hereby incorporated by reference.

Figure 1:
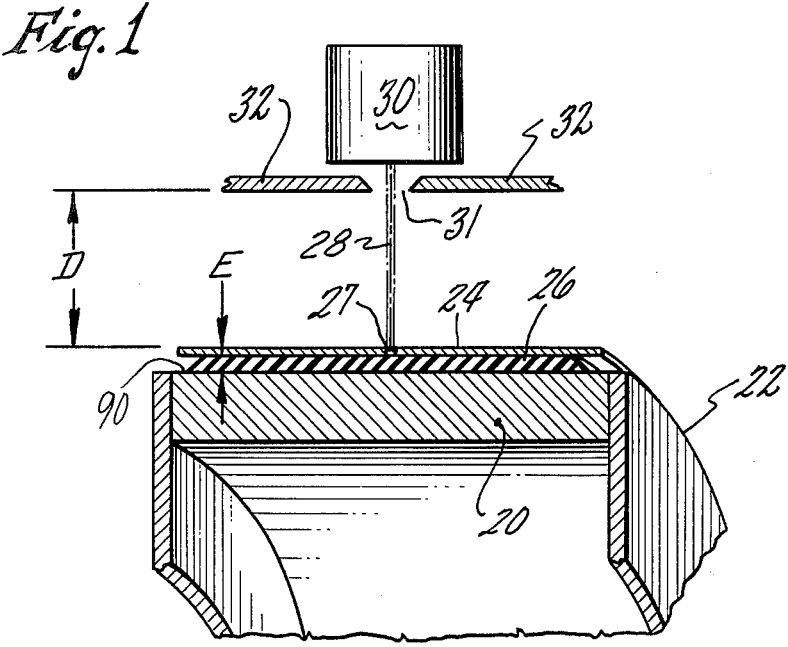
FIG. 1 is a side view of portions of an electron beam apparatus, showing how the beam drills a workpiece clamped on the periphery of a drum shaped workpiece holder.

FIG. 1 illustrates the use of the backer in electron beam drilling. The workpiece holder drum 20 is essentially a hollow cylinder and has a precision outer circumference 22 to which a metal workpiece sheet 24 is clamped by drawing the sheet ends together. Between the panel and the workpiece holder is the backer 26. Drilling of a hole 27 is accomplished by means of a stream of electrons in the form of a beam 28 emanating from a gun 30, and directed at the workpiece through an opening 31 between protective shields 32. The outside diameter surface 22 of the workpiece holder 20 is precisely located a distance D from the gun. (Typically, the plane of the lower surface of the shields 32 is used as the reference for this location.) To position the workpiece precisely with respect to the gun, the metal sheet 24 must be spaced a constant distance E from the outside diameter surface of the workpiece holder. When the sheet is clamped tightly around the workpiece holder, the distance E is determined by the flexibility of the sheet in combination with the characteristics of the backer 26. And it is the making of the backer and the manner in which the sheet metal is clamped on the drum with which the present invention is concerned.

Figure 3:
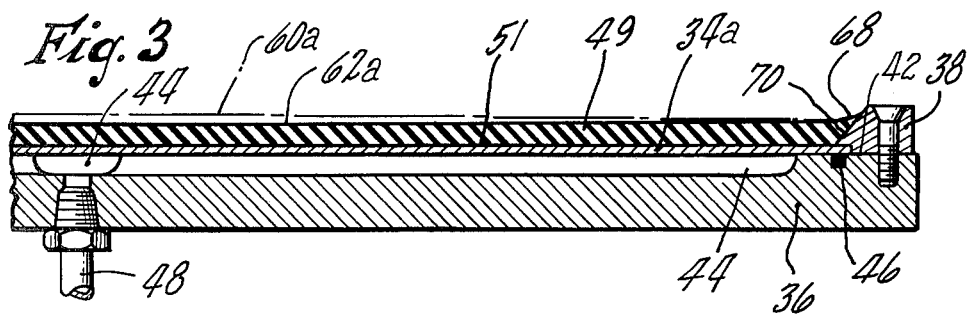
FIG. 3 is a cross sectional view of part of the fixture in FIG. 2, showing channels in the surface, the beveled side rail, and polymer backer material after it is cured.
Figure 2:
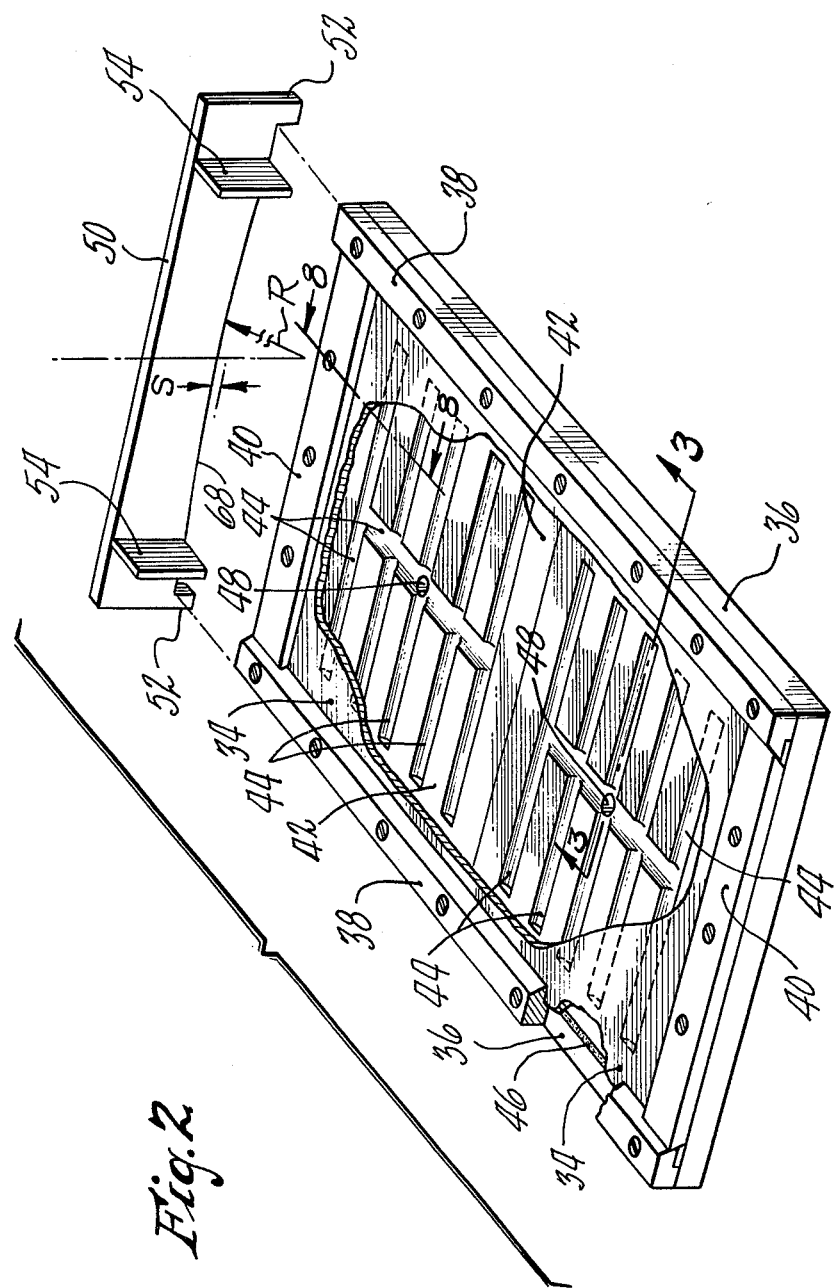
FIG. 2 is a perspective view of the fixture apparatus of the invention, showing how sheet is receivable, and how the leveling board is adapted to move along the length of the fixture.

FIG. 2 shows a sheet 34, of about 145 by 46 cm in length and width, and about 0.6 mm in thickness, together with the inventive apparatus in which it is receivable, so that a backer may be applied. The apparatus is comprised of a base 36 having rails 38, 40 around its periphery. The sheet 34 fits within the cavity defined by the rails 38, 40 and lies on the smooth upper surface 42 of the base 36. The smooth surface 42 of the base has a pattern of connected channels 44, of relatively narrow width. FIG. 3 shows the apparatus in partial cross section, with detail concerning how the sheet mates with the rail and base. The sheet lies on the upper surface 42 of the base and bridges the narrow channels 44. The rails 38 capture the edges of the sheet and press it against the peripheral o-ring seal 46. Thus, the sheet and the base form a sealed cavity to which access is provided by the channels 44 and, at one or more locations, by ports 48. Accordingly, when a vacuum pump is connected to the ports 48, the sheet may be drawn tightly against the base. Of course, the width of the channels is minimized, so that the sheet resists being deflected downwardly into the channels to any significant extent.

To apply a backer to the sheet, a vacuum is sustained while the backer 49 is flowed into the cavity above the sheet, defined by the rails 38, 40 and the upper sheet surface 51. A preferred backer is a room temperature vulcanizing silicone rubber such as RTV-630 (General Electric Co., Waterford, New York). The semi-liquid RTV rubber is leveled by drawing the leveling board 50 across the upper surface of the rails 38. The board, shown in FIG. 2, has guide tabs 52 which engage the outer edges of the rails 38 and thereby locate the board laterally. The board 50 is also fitted with projections 54 which extend along the line of travel of the board and serve to prevent movement of the rubber transverse to the direction of travel, and off the sides of the apparatus, as the board moves along the length of the base.

Figure 4:
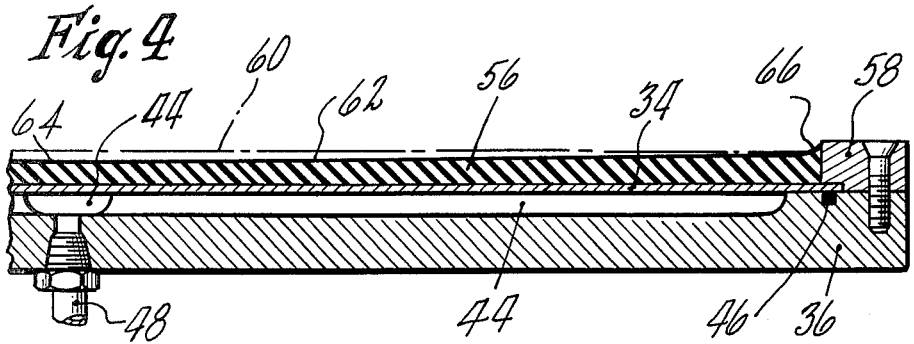
FIG. 4 is similar to FIG. 3 but illustrates the problem which is overcome by the curved leveling board and beveled rails of the invention.

There is a criticality in the design of both the rails 38 and the leveling board 50. FIG. 4 illustrates the problem solved by showing the configuration of backer 56 which results when a straight bottomed leveling board and rectangular shaped rails 58 are used. The phantom line 60 illustrates how the rubber would be expected to appear in cross section, just after it has been leveled, while it is still semiliquid, and after it is cured; since the RTV-630 rubber has insubstantial shrinkage. The solid line 62 illustrates (in exaggerated scale) the configuration of the rubber which is actually found after curing. It is seen that the rubber will be depressed in dimension near the center of the sheet 64, while it has a raised portion 66 at the periphery near the rail. The cause of the depressed center is not fully understood. The solution we disclose herein suggests that some sort of flow phenomena are involved (notwithstanding that the RTV-630 rubber is considered "self-leveling"). The increased thickness at the periphery is attributed to capillary action of the rubber against the rail 58. The backer so-formed is not useful for drilling precision holes in a sheet 34'. When the sheet is pulled tight around a workpiece drum it will be found to be uneven along the drum length, due to the depressed backer at the center 64, and it will be raised up at the periphery 66 where the backer is too thick.

Referring to FIG. 2, in the practice of the invention, the edge 68 of the board 50 has a radius R, and is raised up a distance S at the midpoint. With the aforementioned RTV rubber, and a backer 2.5 mm thick, we have found that S should be about 0.46 mm. The contour and amount of height increase in the board may vary with different backer thicknesses and materials. FIG. 3 illustrates the hypothetical contour 60a of uncured rubber using a curved leveling board, and the level surface contour 62a found after the rubber has cured. The capillary action effects will still be present at the outer periphery 68 of the backer. But, the rail 38 is shaped to eliminate the adverse effect of this effect. As shown in FIGS. 3 and 5, the rail 38 is provided with an inner edge 70 which is at an angle B with respect to the normal to the smooth surface 42 of the base 36. An angle B of about 45° has been found to be satisfactory, and angles between 30° and 60° are at least useful as well. As illustrated by FIG. 5, the angled rail edge 70 need only extend along a portion of the vertical edge of the rail 38, thus leaving a portion 72 which is still vertical.

FIG. 6 shows detail from FIG. 1, and illustrates how the beveled edge of the rail is useful in allowing the sheet 24 to be evenly spaced a distance E, the nominal backer thickness, from the surface 22 of the workpiece holder 20. The shape of the backer 26 is shown in phantom 74, as it is before the sheet is drawn tightly towards the workpiece holder. The solid line 76 indicates how the backer deflects toward the workpiece holder surface 22 when the sheet is tightened around the drum. The relief provided by the rail bevel, between the backer and sheet means that the raised up edge 68 of the backer will not outwardly distort the sheet 24 at its outer edge.

FIG. 7 shows another embodiment of the invention. The backer 26a has an undercut or relief 78, which is provided by a rail having a stepped edge, as opposed to a beveled edge. Although we prefer the beveled edge, the foregoing and other embodiments will enable practice of the invention. The general mode of this aspect of the invention is to provide less thickness of backer at the edge, to enable compliance of the backer at the edge with the mean thickness of the backer, as it is compressed between the sheet and workpiece holder.

Of course, it is possible to make the backer first using a square edge rail, and then to trim the backer at an angle, or to remove the surplus material. However, inasmuch as a certain minimum overlap of the rail on the sheet has been found necessary to obtain adequate vacuum sealing in the fixture, such a practice would mean that the effective overall width of the backer would be reduced. This is less efficient, in making smaller the area of sheet which can be drilled.

It is desirable in general that the rails 40, at the longitudinal ends of the sheet be beveled as well. However, in practice there is somewhat more latitude at the longitudinal ends of the sheet and trimming may be used. Typically the sheet ends are drilled to engage the clamps which serve to draw the sheet ends together, to tighten the sheet around the workpiece holder.

To use the apparatus the rails are clamped on the sheet and the vacuum (about 700 mm Hg) is applied to the channels, creating sufficient differential pressure to draw the sheet flat. The silicone rubber should be mixed with its catalyst by vigorous mechanical agitation, and then vacuum degassed for about 15 minutes, to remove entrapped air. After pouring between the rails and leveling, the backer is allowed to cure about 16 hours at room temperature. The sheet with the partially cured backer is then removed from the fixture and oven cured at about 100° C. for one hour, whereupon it is ready for use. We have not found a release agent necessary on the rails but one may be used if needed. (Of course, the sheet is carefully abraded and cleaned prior to applying the backer, to promote adherence.)

The way the sheet is laid on the smooth surface of the base is important. Generally, there will tend to be a bias in the sheet waviness. That is, it will be more raised up in one direction with respect to the general plane of the sheet, as compared to the opposing direction. The sheet should be applied to the smooth surface so that the waviness is positive with respect to the surface. This is illustrated by FIG. 8 where it is seen that the positive displacement of the waved postion 80 creates a cavity 82 between the sheet 84 and the surface 42 of the base 36. In doing this it will be found that the sheet is more easily drawn flat. But more importantly, when the sheet is mounted against the workpiece holder, the waviness will now be negative with respect to the holder, and the resistive force of the backer will bring it positively back to the desired distance E from the holder.

We have used differential pressure created by atmospheric pressure in combination with a vacuum. Other gas pressure differentials may be used. Also, if the sheet is magnetic, then magnetic attraction may be used in substitution, in which case the channels in the fixture surface will not be needed. Other mechanical or electrical means may be used to meet our invention requirement for a uniform unit force applied on the sheet, to press it against the fixture.

While we describe RTV silicone rubber, other polymers such as waxes, and various other materials may be used in the practice of the invention. They must be flowable in the sense of being of sufficiently low viscosity that they will assume an even layer, level with respect to the surface of the fixture. And they must be adapted to solidify by cross-linking (curing) or other mechanisms, so that the sheet may be removed from the fixture with the layer having sufficient viscosity to hold its shape during handling and during electron beam drilling. Thus, we contemplate that our invention may be used without the curved leveling board, when the nature of the backer is such that, in its flowable state, it assumes a uniform thickness layer on the surface of the sheet.

When backers which set up or harden faster than RTV rubber are used, and where production demands warrant, the backer may be applied continuously as a long sheet, rather than using the batch type method and fixture which we describe herein. In such continuous application, the backer would rapidly solidify; the sheet could be drawn across a flat surface or over the outer diameter of a smooth cylindrical drum. A suitably positiohed leveling board and edge-shaping members would form the backer. Thus, while our preferred embodiment is described in terms of a fixture with a flat smooth surface, the surface does not need to be planar in the general practice of the invention. The surface only need to be smooth, so that the waviness of the sheet is eliminated by the pressure on the sheet, and so that a leveling board may be spaced a constant distance apart from the surface.

There is another somewhat different embodiment of the invention which is useful, as illustrated by FIG. 9. A straight sided rail may be used to form the peripheral edge of the backer 26b and this will result in a raised up portion 86 at the periphery of the backer. The smooth outer surface 90 of a drum 20b has a circumferential slot 88. The sheet 24b with adhered backer 26b is positioned so that the raised edge portion 86 is located over the slot. Thus, the relief at the periphery of the sheet in this embodiment of the invention is provided in the drum, and not within the backer itself. The disadvantage of this embodiment is that accurate locating of the sheet on the workpiece holder is required, and different workpiece holders have to be used for different widths of sheets.

Although this invention has been shown and described with respect to a preferred embodiment, it will be understood by those skilled in the art that various changes in form and detail thereof may be made without departing from the spirit and scope of the claimed invention.

We claim:

1. The method of applying backer material to the surface of a sheet metal workpiece having a wavy surface characterized by (a) placing a first side of the sheet on the smooth surface of a fixture, said sheet first side forming a cavity with the surface where the sheet is wavy, due to the wavy area being displaced from the surface;

(b) applying pressure to the first side of the sheet against the fixture surfaces by creating a vacuum between the first side of the sheet and the fixture surface, and allowing atmospheric pressure to act on the second side of the sheet;

(c) applying a polymer liquid to the opposing second side of the sheet and curing the polymer at least partially as it adheres to the sheet, forming a relief space around the peripheral edge of the cured polymer where it is adhered to the sheet by means of the configuration of parts of the fixtrue abutting said edge, and applying a greater quantity of uncured polymer to the center of the sheet than to the periphery, to provide a uniform thickness in the cured polymer; and (d) releasing the vacuum and removing the sheet from the fixture.

2. Apparatus for adhering a uniform layer of solidified material such as an electron beam drilling backer to the surface of a wavy sheet which comprises (a) a fixture having a smooth channeled surface adapted to receive a sheet;

(b) means for connecting the channels to a source of vacuum;

(c) means for sealing the periphery of a sheet to the surface, to enable creation of a vacuum between the sheet and the surface, which vacuum causes the sheet to be pressed against the smooth channeled surface;

(d) rails, removably attached to the fixture surface and circumscribing the periphery of the fixture where a sheet is receivable, to form a cavity above the surface of a sheet mounted in the fixture into which flowable material may be deposited, cured to a solid, and adhered to the sheet as a layer; at least one rail having an edge which creates in the material layer solidified thereagainst a relief, so that the overall quantity of material at the periphery of the layer as measured transverse to the layer is less than the average quantity of material in the rest of the layer; and (e) a leveling board guided by the rails, for leveling flowable polymer placed between the rails, the board having a concavely curved leveling surface facing the smooth surface of the fixture.

* * * * *